June 19, 1951  H. W. RONFELDT  2,557,766
TUBE CONNECTING DEVICE
Filed July 16, 1949
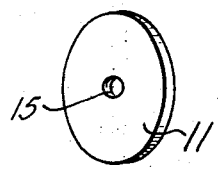
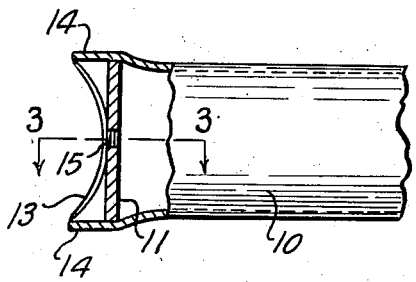
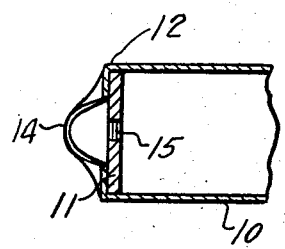
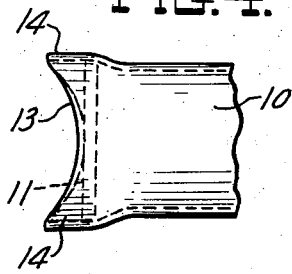
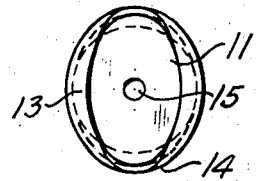
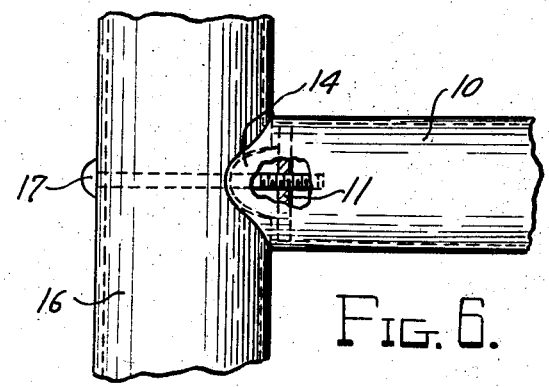
INVENTOR
HOWARD W. RONFELDT
BY
ATTORNEY Patented June 19, 1951

2,557,766

UNITED STATES PATENT OFFICE 2,557,766

TUBE CONNECTING DEVICE

Howard W. Ronfeldt, Toledo, Ohio

Application July 16, 1949, Serial No. 105,178

2 Claims. (Cl. 287—54)

This invention relates to the connecting of metal tubes but more particularly to connecting an end portion of one tube to a side wall of another tube, and although of use for a variety of purposes, of particular use in the fabrication of metal furniture which is disassembled or knocked down for shipping and storage.

An object is to produce a new and improved method for connecting metal tubes of the above character which can be readily and conveniently accomplished and by which the tubes are detachably connected rigidly by the use of a single screw and which is so designed that a stronger joint is effected, the same being accomplished inexpensively and with such simplicity that no particular skill is required.

Another object is to produce a new and improved metal tube connection whereby the end of one tube is detachably and rigidly secured to a side wall of another tube, the assembly requiring but a single screw passing through aligned holes in one tube for convenient engagement with a nut-like element fixed to the end portion of the other tube.

Other objects reside in details of contruction, arrangement and assembly hereinafter described, and for purposes of illustration but not of limitation, an embodiment of the invention is shown on the accompanying drawings, in which Figure 1 is a perspective view of the nut-like disc which is secured in the end portion of one tube;

Figure 2 is a fragmentary side elevation of a tube broken away to show in section the nut-like disc secured in position of use and with the end portion of the tube shaped to conform to the contour of the tube to which it is to be connected;

Figure 3 is a longitudinal sectional view substantially on the line 3—3 of Figure 2;

Figure 4 is a side elevation of the end portion of the tube shown in Figures 2 and 3;

Figure 5 is a front end elevation of the tube end shown in Figure 4; and

Figure 6 is an elevation showing a connection between a pair of tubes and broken away to show the connection between the screw and the nut-like disc.

The illustrated embodiment of the invention comprises a relatively thin-walled metal tube 10. The first step in forming the connecting end portion for this tube is to force a disc 11 into the end of the tube by any suitable means. The disc 11 in this instance is oval in shape, the widest diameter being slightly greater than the inside diameter of the tube 10. Consequently, when the disc is forced inside the tube 10, the walls of the latter are forced or bulged outwardly as indicated at 12, to accomodate the larger diameter portion of the disc 11. The next step in the formation of the connecting end portion for the tube 10 is to crimp the metal over the front end portion of the disc 11 and at the same time press the metal into a cradle-like end portion having a curvature 13 to conform to the side wall of the tube to which the tube 10 is to be connected. As shown, this provides a pair of outwardly projecting flanges or projections 14 from which the metal curves inwardly toward the disc 11 to provide the curved cradle or cavity 13.

It is to be understood that the end portion of the tube 10 may not always be uniformly curved as shown on the drawings, because although the uniform curvature is such as to dispose the tube 10 at approximately right angles to the other tube to which it is connected, by varying this curvature such as by shortening one of the flanges or projections 14 relative to the other, then it will be manifest that one tube can be disposed at an angle greater or less than ninety degrees with respect to the tube to which it is to be joined. It will be readily understood that these changes in the contour of the protion of the tube projecting beyond the nut-like disc may be made by using different dies, the important feature being that such end portion crimps the metal to retain the disc 11 in position and not only conforms to the contour of the other tube but the relative angularity of the two tubes when assembled. The center of the shaped end portion of the tube is open to reveal the screw-threaded opening 15 in the disc 11.

16 designates the other tube (Figure 6) to which the tube 10 is to be connected, in this instance a right angle connection being desired. All that has to be done to the tube 16 is to drill a pair of holes diametrically through the tube so that a screw 17 may extend through these holes and into threaded engagement with the hole 15 of the nut-like disc 11. By drawing up tightly on the screw 17, the tubes 10 and 16 are drawn into intimate engagement and since the cradle 13 is shaped to the outside contour of the tube 16, it not only forms a secure and sturdy joint, but one pleasing in appearance. When it is desired to disassemble the tube connection, the screw 17 may be disengaged, thereby enabling the tubes to be readily and conveniently separated from each other for packaging or storage purposes.

It is to be understood that numerous changes in details of construction, arrangement and op-

What I claim is:

1. A connecting device for a pair of metal tubes so that an end of one tube will abut the side of the other tube, said device comprising a disc-like nut having one diameter greater than the diameter of the said one tube, said nut having a press fit with the respective tube and extending inside same a short distance from the end thereof, a shoulder in said one tube militating against inward movement of the nut therein, a cradle shaped end portion on said one tube partially to embrace the side of the other tube, flanges integral with said end portion engaging the outer face of said nut to militate against outward movement of said nut from the respective tube, a pair of aligned apertures in said other tube, and a screw passing through said apertures and engaging said nut.

2. A connecting device for a pair of metal tubes so that an end of one tube will abut the side of the other tube, said device comprising a nut in the form of a flat oval disc having a central screw-threaded opening, said nut having a press fit with the respective tube and extending inside same a short distance from the end thereof, a shoulder in said one tube militating against inward movement of the nut therein, a cradle shaped end portion on said one tube partially to embrace the side of the other tube, flanges integral with said end portion engaging the outer face of said nut to militate against outward movement of said nut from the respective tube, a pair of aligned apertures in said other tube, and a screw passing through said apertures and engaging said nut.

HOWARD W. RONFELDT.

REFERENCES CITED

The following references are of record in the file of this patent:

UNITED STATES PATENTS

| Number | Name | Date |
|---|---|---|
| 853,566 | Sparks | May 14, 1907 |
| 1,404,522 | Harris | Jan. 24, 1922 |

FOREIGN PATENTS

| Number | Country | Date |
|---|---|---|
| 671,993 | France | Sept. 9, 1929 |
| 706,952 | France | Apr. 4, 1931 |